United States Patent Office.

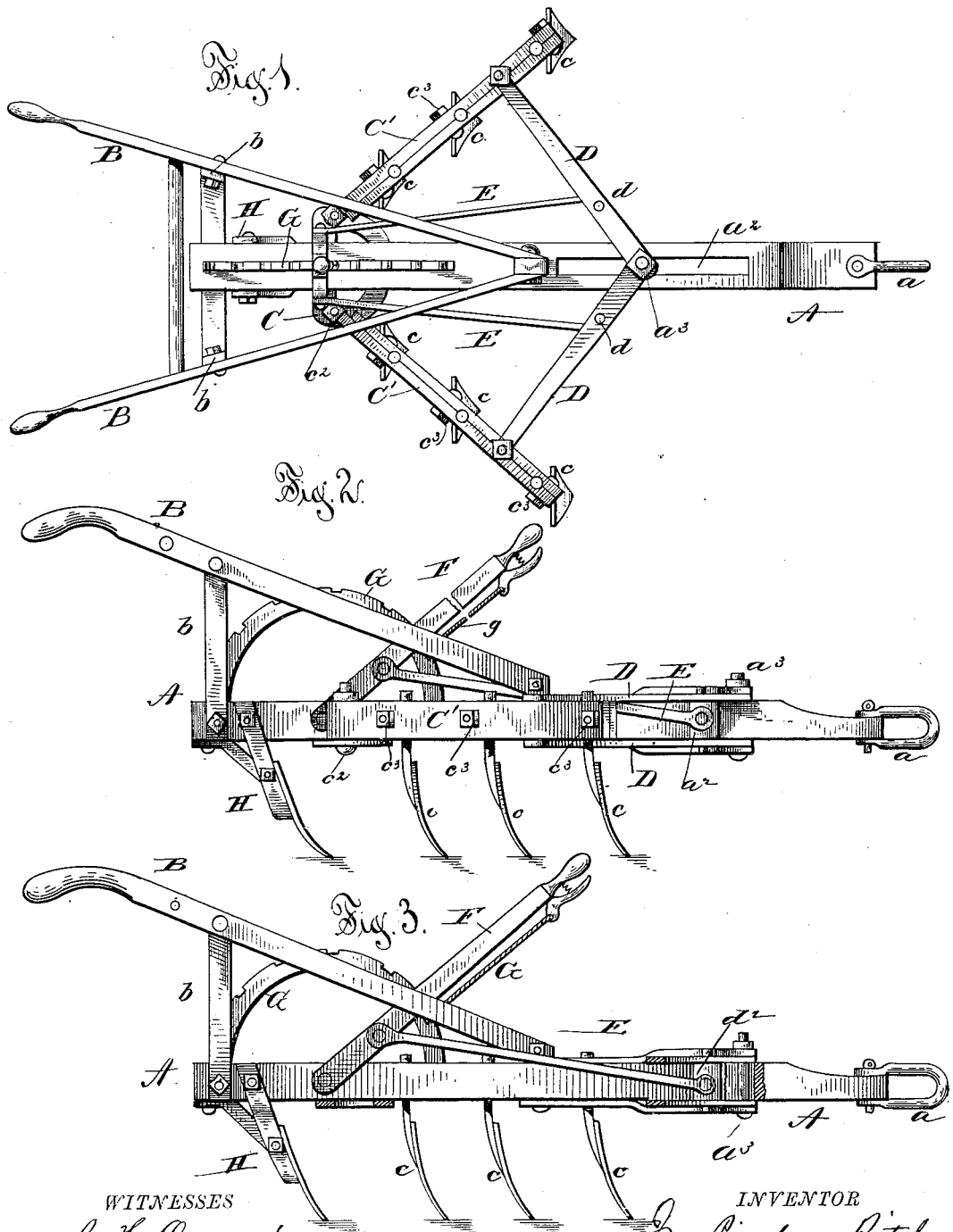

JOHN PINCKNEY RITCH, OF CHARLOTTE, NORTH CAROLINA, ASSIGNOR OF ONE-HALF TO JAMES F. JOHNSTON, OF SAME PLACE.

CULTIVATOR.

SPECIFICATION forming part of Letters Patent No. 346,223, dated July 27, 1886.

Application filed March 30, 1886. Serial No. 197,188. (No model.)

*To all whom it may concern:*

Be it known that I, JOHN PINCKNEY RITCH, of Charlotte, county of Mecklenburg, and State of North Carolina, have invented a new and useful Improvement in Cultivators, of which the following is a full, clear, and exact description, reference being had to the accompanying drawings, making part of this specification.

My invention relates to an improvement in cultivators for working the soil between two rows of plants, whereby the adjacent sides of two rows of plants may be cultivated at one and the same time.

My invention consists in the combination, with a central beam, of laterally-projecting bars or beams pivoted thereto at their rear ends, and carrying the cultivator-teeth, links connecting the vibrating ends of said laterally-projecting bars with the main beam, and means for adjusting the inner ends of the said links back and forth for varying the angle of the tooth-bars relative to the central beam, all substantially as hereinafter described.

My invention consists, also, in the combination, with said central beam, of a detachable tooth attached to the rear end thereof, and in the manner of attaching the cultivator-teeth to the laterally-projecting bars; also, in certain details of construction and arrangement hereinafter specified.

In the accompanying drawings, Figure 1 represents a plan view of my improved cultivator; Fig. 2, a side elevation of the same, and Fig. 3 a longitudinal section.

A represents the main central draft-beam of the machine, to which the team is attached by a clevis, $a$, or in any usual or preferred manner.

B B represent plow-handles of ordinary description, attached by a bolt or other fastening to the draft-beam, as shown. Their rear ends are elevated and upheld by uprights or braces $b\, b$, secured to the beam A at or near the rear end thereof.

C represents a bracket secured to the draft-beam, preferably on the under surface thereof. To this bracket, on either side of the beam A, are pivoted two laterally-projecting detachable bars or beams, C' C', which carry the cultivator-teeth $c\, c$. These lateral beams C' are pivoted to the bracket C by a vertical bolt, $c^2$, or in any suitable manner so as to be readily detached when desired.

Instead of constructing the lateral beams of one piece, as is usual in this class of machines, I make them of two bars, as shown in Fig. 1, provided on their inner adjacent faces with grooves, either round or square, as preferred, or according to the form of the shanks of the cultivator-teeth, said grooves being for the reception of the shanks of the teeth $c$, above referred to. When said cultivator-teeth are placed therein and adjusted to the height and angle desired, the two bars or halves of the lateral beam are drawn together and securely united by means of through-bolts $c^3$, as many as may be necessary, according to the length of the lateral beams. By this construction the teeth $c\, c$ may be removed and replaced without difficulty, and their height and angle adjusted with ease; also, a larger or smaller number of teeth may be used, as the nature of the plants and the soil may require.

The central beam, A, is slotted, as shown at $A^2$, to allow the movement therein of a sliding pin or bolt, $A^3$, which pivotally unites the inner ends of two links, D D, the outer ends of which are pivoted to the lateral beams C'. These links D are double, or are each composed of two pieces—an upper and a lower portion, as shown in Fig. 2, the upper portion resting upon the upper faces of the beams A and C', and the lower beneath the lower faces of the same, which secures greater steadiness to the working of the parts.

Between the upper and lower portions of the links D, at convenient points, $d$, of each link, is a swiveling block or pin, $d^2$, to which two links, E E, are pivotally connected. These links E E extend rearwardly, and at their rear ends are pivoted to the arms of a bifurcated lever, F, pivoted to the central beam, A. The lever F is bifurcated to adapt it to straddle the main beam A, and also a segmental rack, G, described in the arc of a circle of which the center is the pivotal point of the lever G.

From the above description the operation of the machine will be apparent. The lever G being within convenient reach of the driver, who stands at the handles B of the cultivator, by vibrating said lever the operator can at will, and when necessary or desirable, advance or retract the inner ends of the links D, which will cause the said links to act upon the lateral beams C' and adjust their outer swinging ends toward or away from the main central beam, A, for varying the width of the cultivator according to the varying distances between the rows of plants. When adjusted as desired, the lever G may be held in its adjusted position by a latch, g, of any usual or preferred form, which engages the rack G described.

I am aware that pivoted lateral beams or tooth-bars have been employed made adjustable relatively to the central draft-beam of the machine; but I believe such lateral beams have been pivoted at their forward ends to the central beam. I consider it very important to pivot these lateral beams at their rear ends to the central beam, for the reason that the teeth drag the litter and trash away from the plants into the middle of the furrow, thus preparing the plant for the use of the hoe. The teeth of the cultivator are arranged at such distances apart and at such angles that the furrow made by one tooth will be filled by the soil thrown up by the succeeding tooth. It will also be apparent that the angle of the side beams may be adjusted while the machine is in operation.

At the rear end of the central beam, A, is secured a tooth, H, which is so constructed and arranged that it may be easily detached from the rest of the machine. By removing the central tooth the cultivator may be employed as a straddle-row cultivator.

Having now described my invention, I claim as new—

1. In a cultivator, the combination, with the central slotted draft-beam, of the forwardly-diverging lateral tooth-beams hinged at their rear ends to the central beam, the pivoted links D D, connecting the forward ends of the lateral beams with the slotted draft-beam, the adjusting-lever F, and the links E E, connecting said lever and the links D D, all substantially as and for the purpose described.

2. In a cultivator, the combination, with the central beam, of the pivoted lateral tooth-beams C', carrying the teeth c c, the links D, the links E, swiveling blocks $a^2$, the semi-annular retaining-rack G, and the adjusting-lever F, pivoted to the central beam and striding said rack, all arranged and adapted to operate substantially as described.

3. In a cultivator, the combination, with a central slotted beam, A, of the lateral beams C', pivoted thereto at their rear ends, the adjusting-links D, having a sliding connection with the main beam, the lever F, semi-annular rack G, retaining-latch g, and the links E, interposed between the lever F and links D, and having a universal-joint connection with the latter for operating them, substantially as and for the purpose described.

In testimony whereof I have hereunto set my hand this 25th day of March, A. D. 1886.

JOHN PINCKNEY RITCH.

Witnesses:
A. BRADY,
S. F. HOUSTON.